March 25, 1941.  W. F. EPPENSTEINER  2,236,471
CASTING APPARATUS
Filed May 24, 1939    7 Sheets-Sheet 1
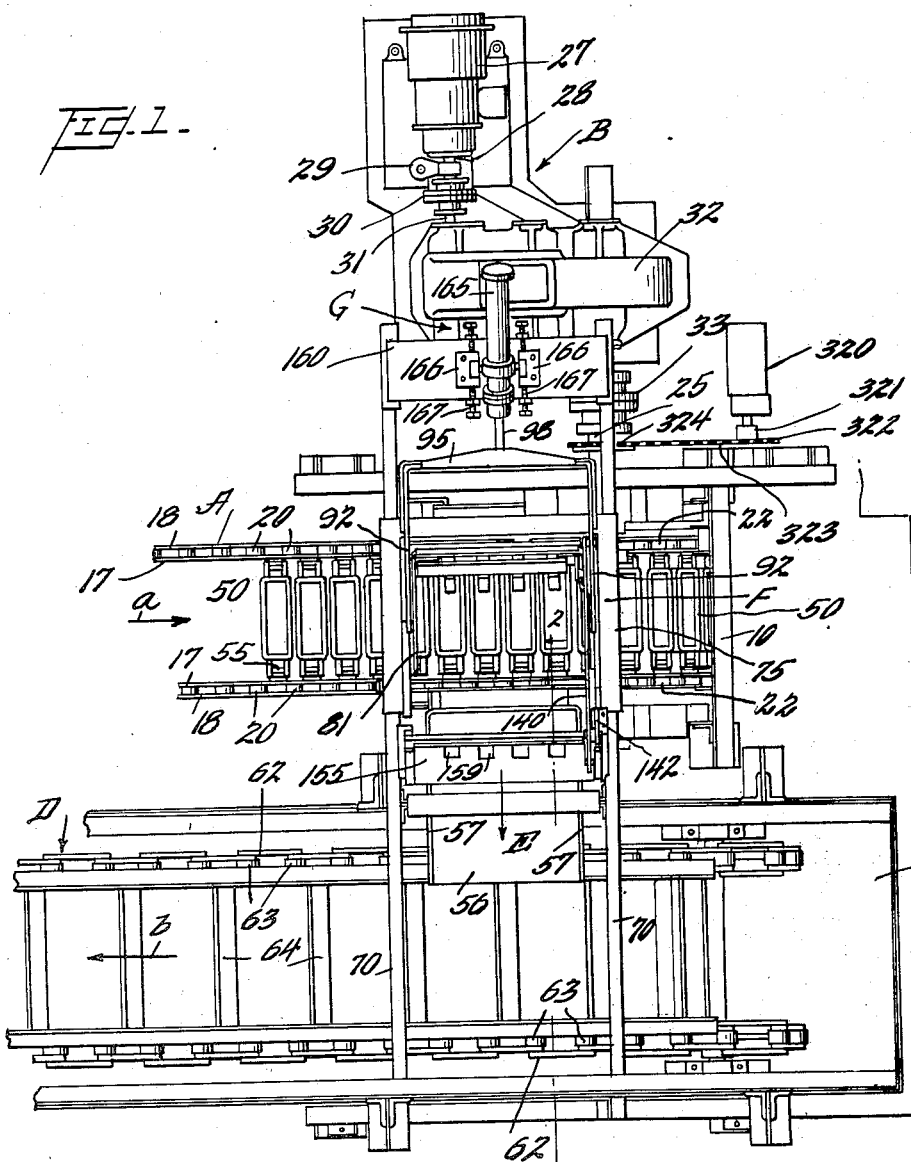
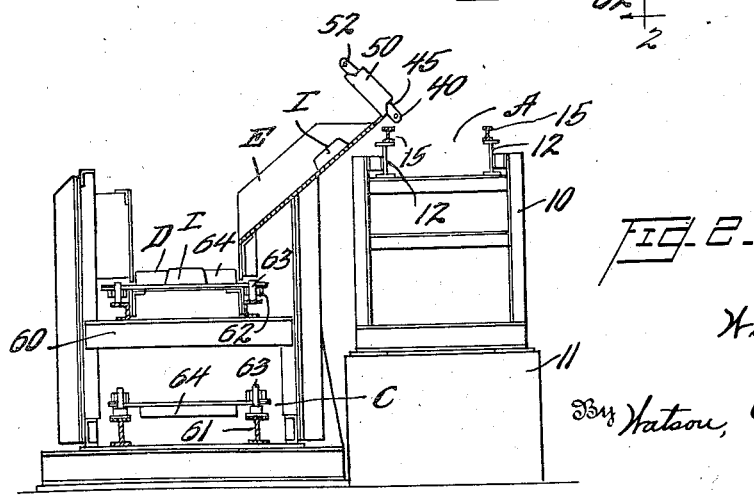
Inventor
William F. Eppensteiner
By Watson, Cole, Grindle & Watson
Attorney March 25, 1941.　　W. F. EPPENSTEINER　　2,236,471
CASTING APPARATUS
Filed May 24, 1939　　7 Sheets-Sheet 2
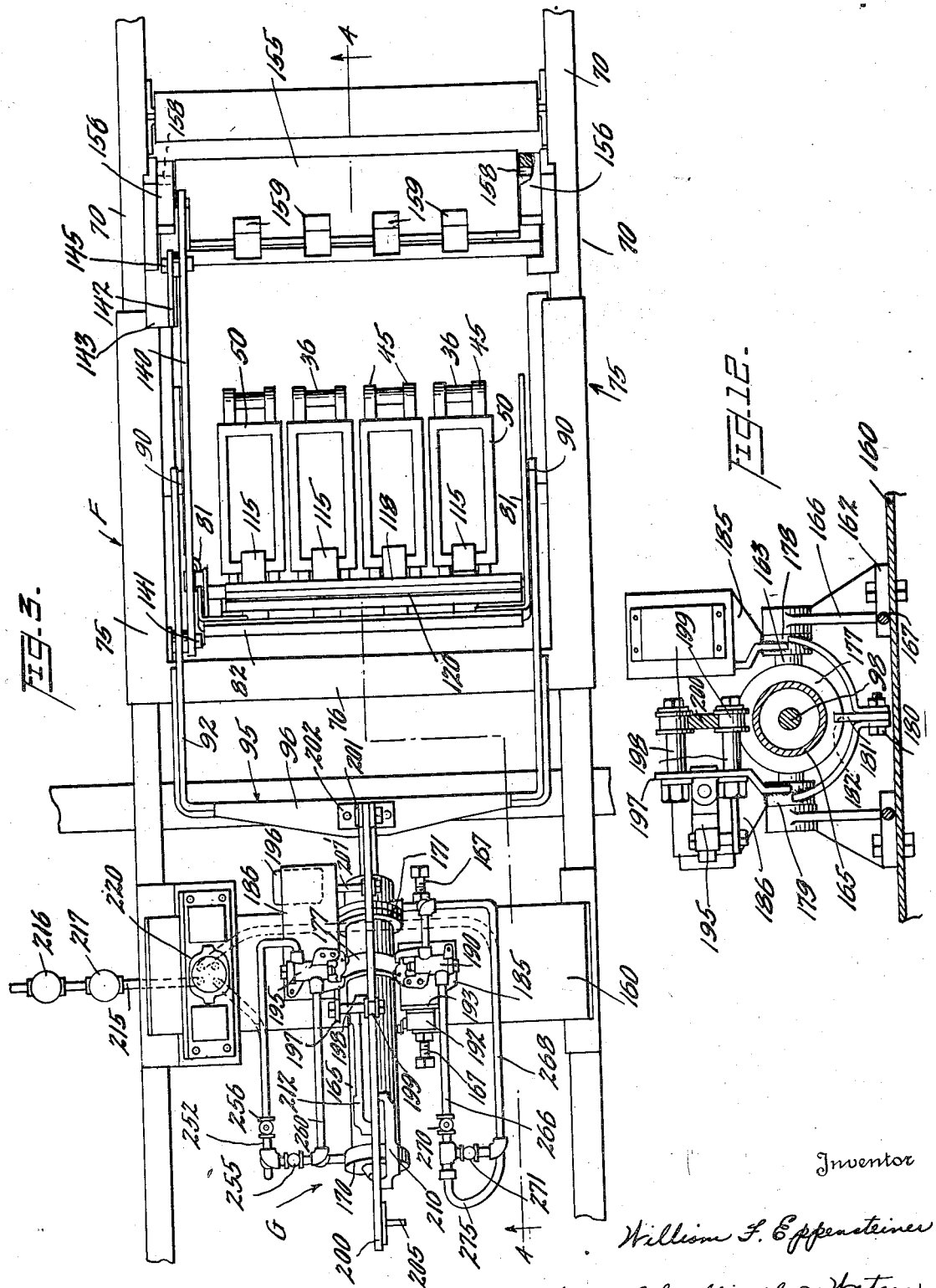
Inventor
William F. Eppensteiner
By Watson, Cole, Grindle & Watson
Attorney March 25, 1941. W. F. EPPENSTEINER 2,236,471
CASTING APPARATUS
Filed May 24, 1939 7 Sheets-Sheet 3
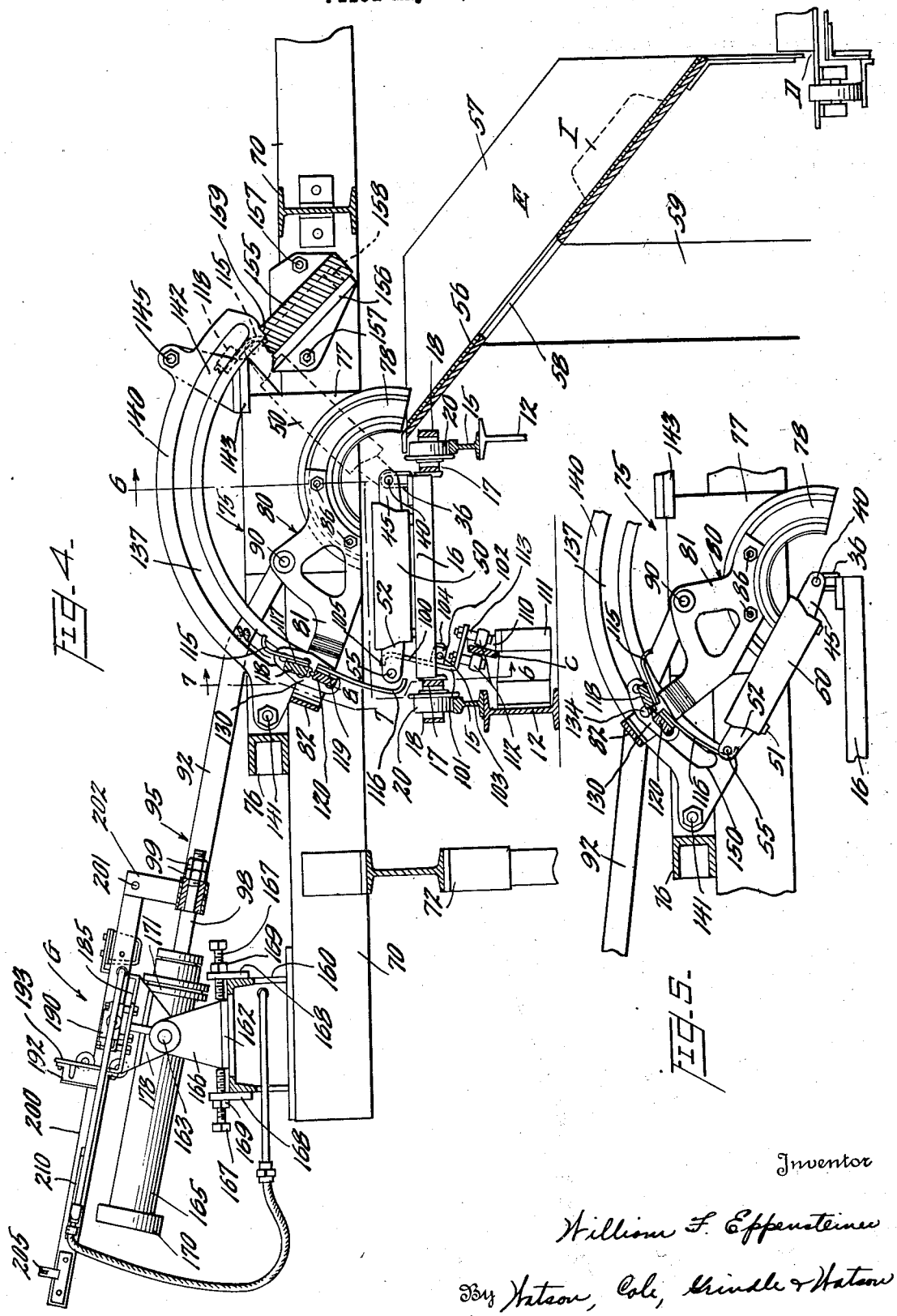
Inventor
William F. Eppensteiner
By Watson, Cole, Grindle & Watson
Attorney March 25, 1941.  W. F. EPPENSTEINER  2,236,471
CASTING APPARATUS
Filed May 24, 1939  7 Sheets-Sheet 4
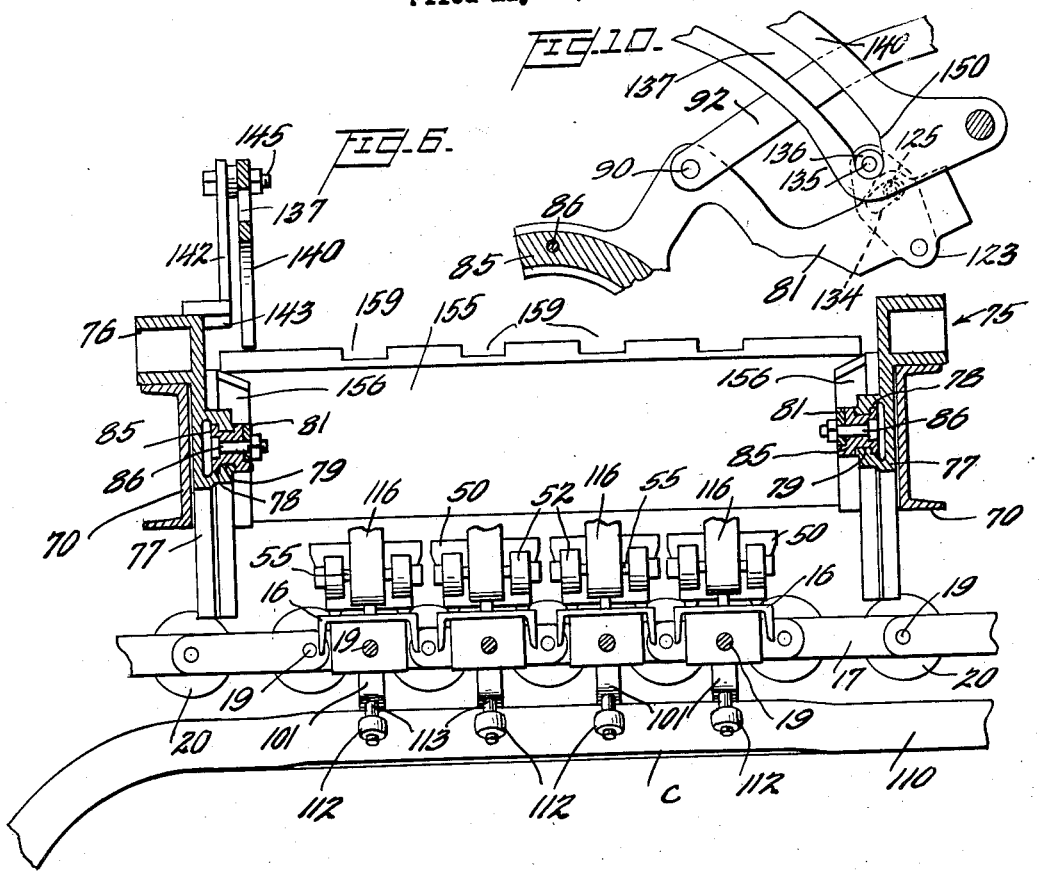

March 25, 1941. W. F. EPPENSTEINER 2,236,471
CASTING APPARATUS
Filed May 24, 1939 7 Sheets-Sheet 5
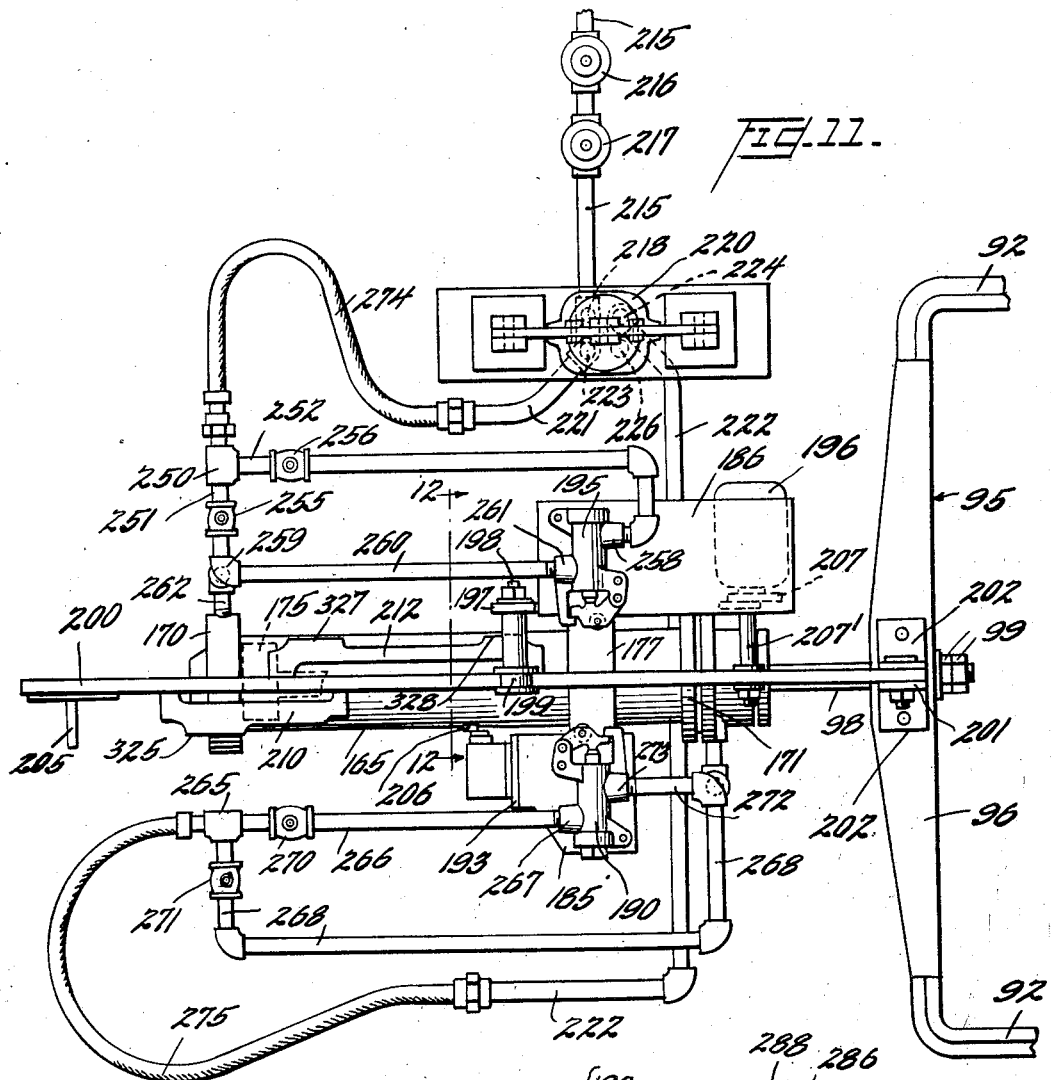
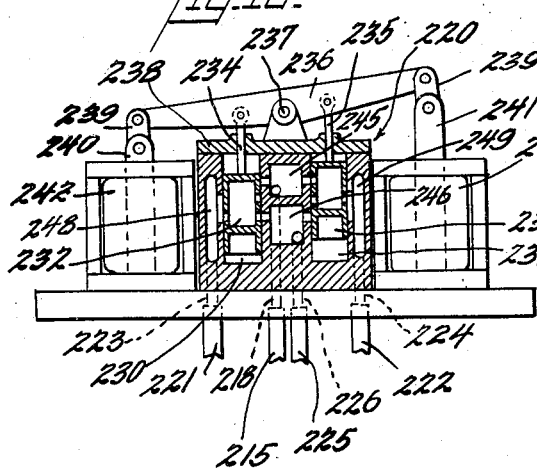
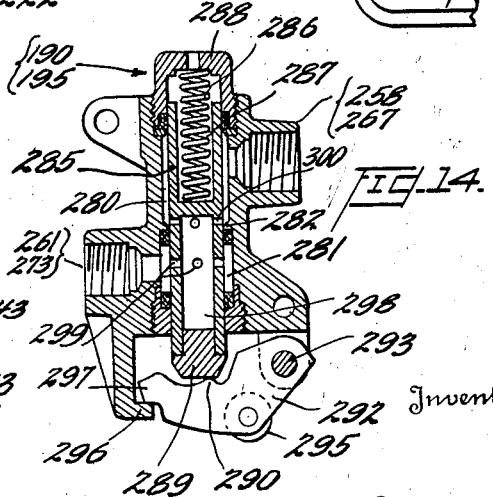
Inventor
William F. Eppensteiner
By Watson, Cole, Grindle & Watson
Attorney March 25, 1941.  W. F. EPPENSTEINER  2,236,471
CASTING APPARATUS
Filed May 24, 1939   7 Sheets-Sheet 6
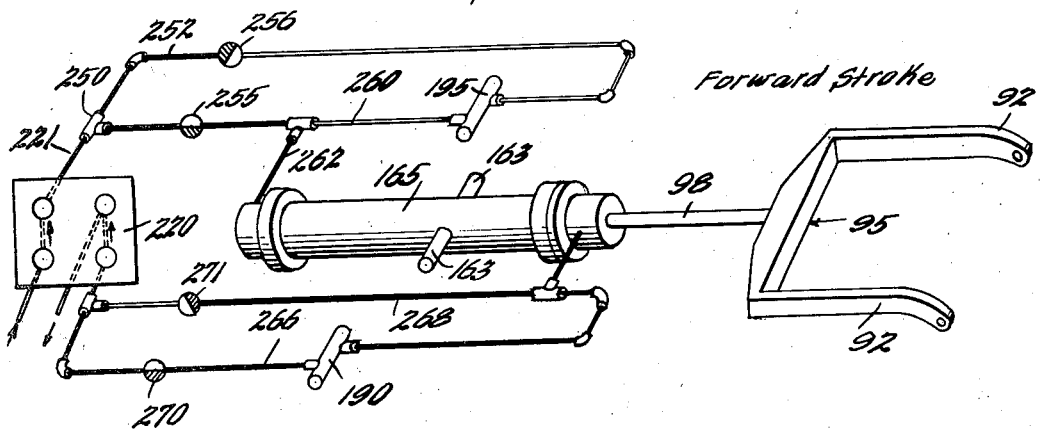
FIG. 15. — Forward Stroke
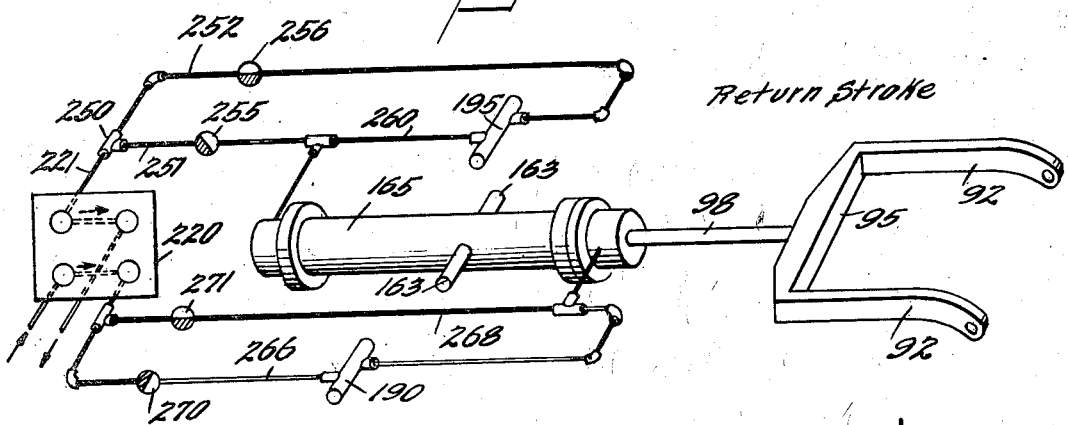
FIG. 16. — Return Stroke
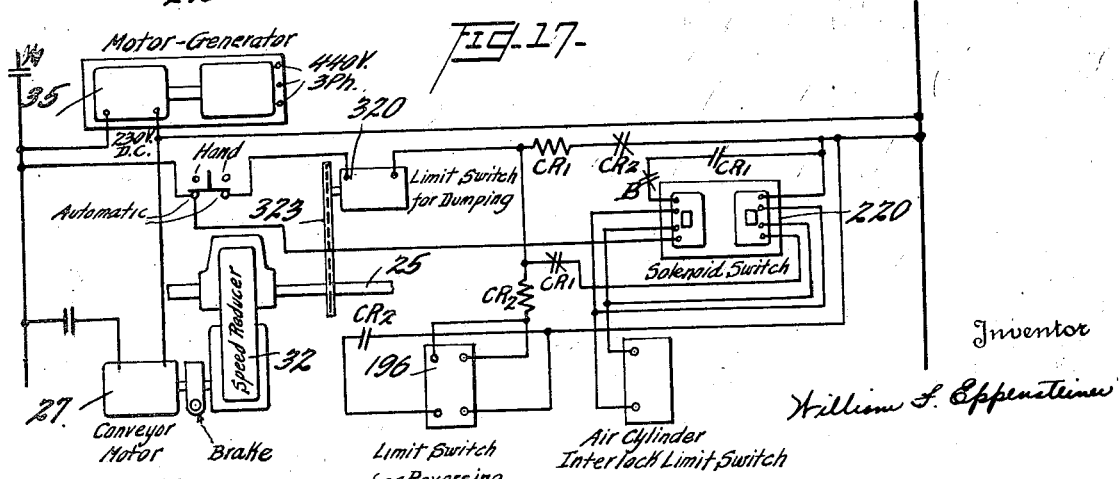
FIG. 17.
CR1 and CR2 = Control Relays
B = Brake Contactor
Inventor
William F. Eppensteiner
By Watson, Cole, Grindle & Watson
Attorney March 25, 1941.  W. F. EPPENSTEINER  2,236,471
CASTING APPARATUS
Filed May 24, 1939   7 Sheets-Sheet 7
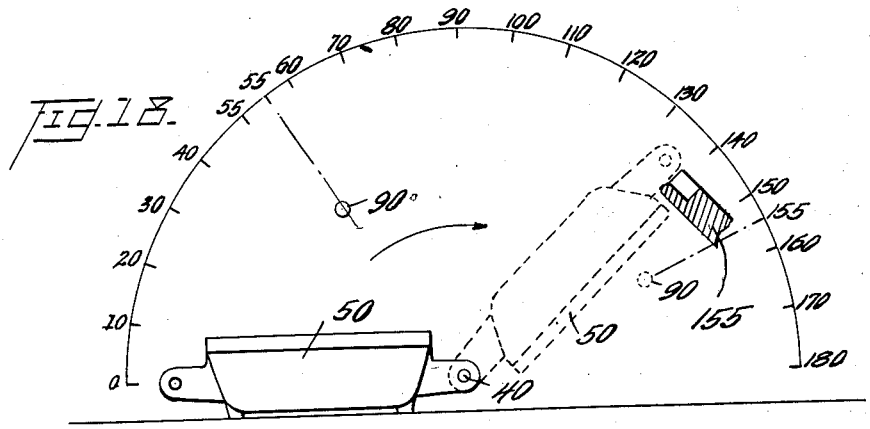
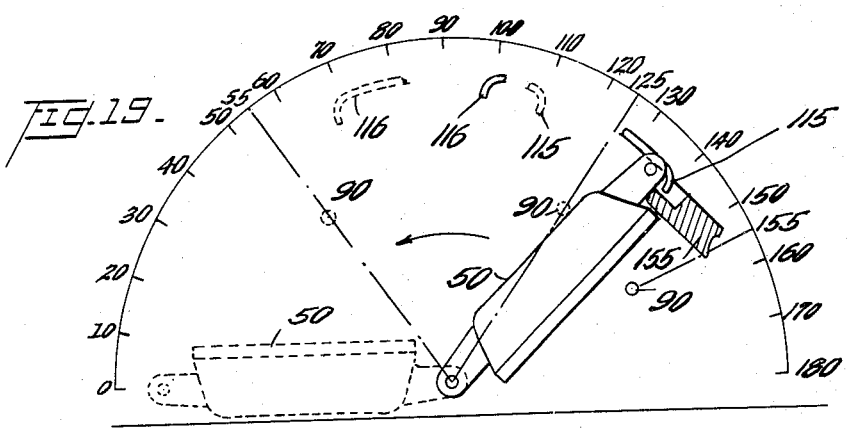
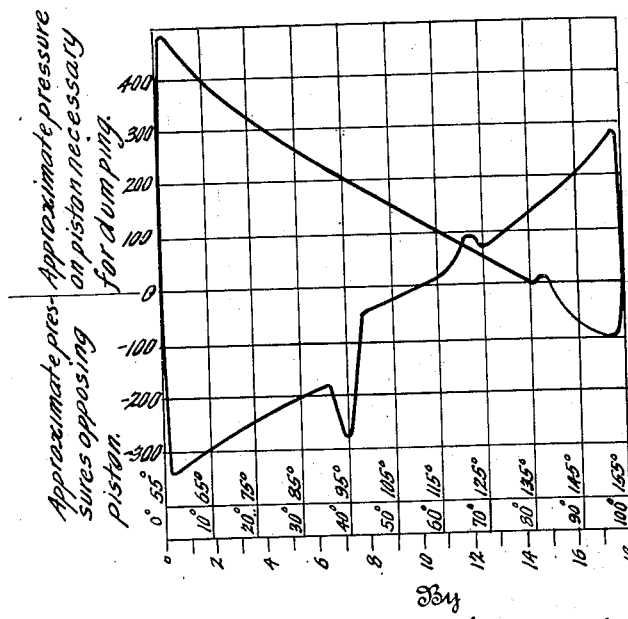
Inventor
William F. Eppensteiner
By Watson, Cole, Grindle & Watson
Attorney Patented Mar. 25, 1941

2,236,471

UNITED STATES PATENT OFFICE 2,236,471

CASTING APPARATUS

William F. Eppensteiner, Woodbridge, N. J., assignor to M. H. Treadwell Company, Inc., New York, N. Y., a corporation of New York Application May 24, 1939, Serial No. 275,564

16 Claims. (Cl. 22—94)

This invention relates to metal casting apparatus, and more particularly to devices for discharging the castings from the molds.

The general object of the invention is the provision of a novel and improved casting machine installation for the production of ingots or pigs, and also of shaped castings of certain kinds—whether of iron, brass, copper, lead, white metal, or other materials. This general purpose of the invention also includes the provision of novel means for automatically discharging the castings from the molds.

It is well known in the art of metal founding that in casting brass in continuous or intermittent casting machines employing metallic molds, the ingots or castings have an especially strong tendency to cling to the surfaces of the molds, and much difficulty has been experienced in dislodging and ejecting the castings. Various proposals have been made for loosening and dislodging the ingots by jarring the molds as they reach a point on the conveyor remote from the pouring ladle, by ramming or punching the ingots from the molds by means of an ejector or plunger, by prying or wedging the ingot out of the mold by the use of a mechanically operated pick or chisel, and by other methods which involve rather violent treatment of the ingots or castings and also of the casting machine itself.

Trade specifications require that brass ingots, as well as other metallic castings must be in good condition, that is, not broken, nicked, or marred in any way. These specifications cannot be complied with by the use of methods of ejection such as those to which reference has been made, since even in processes which do not require actual contact between the ingots and the ejecting instrumentality, the jarring or vibration of the casting machine conveyor incidental to the discharge of the ingots prevents the maintenance of that quiescence of the molten metal in the molds while cooling, which is essential to the production of flawless castings.

Consequently, it is a more particular object of the invention to provide apparatus for the discharge of castings from the molds of casting machines by dumping the molds successively and intermittently, and effectively jarring the castings or ingots loose therefrom; the jarring or dumping means being mounted or supported independently of the conveyor so that the latter is not disturbed in any way by the dumping operation.

Another object of the invention is the provision of automatic, electrically controlled, pneumatic actuating means for the ingot dumping apparatus, which is correlated with the operation of the intermittently moving casting machine, so that it becomes effective during the periods when the mold conveyor of that casting machine is stationary, as when the metal is being poured, and is locked out of operation while the conveyor is in motion.

A further object is to provide an improved ingot discharging mechanism which is adapted to dump the molds transversely of the path of a straight-line conveyor, and not over the sprocket wheels at the end thereof, whereby the bosh or quenching tank which receives the ingots may be disposed parallel with and at a level not much below that of the mold conveyor, thus greatly facilitating—and reducing the expense of—the foundry installation.

In its preferred embodiment, the invention contemplates the provision of a straight-line intermittently advanced casting machine comprising an endless series of mold chairs to which the molds are pivoted at one side and releasably latched at the other. Adjacent the chain conveyor formed by this series of chairs, and at a point spaced from the pouring ladle a sufficient distance to allow the ingots to solidify and cool to a certain degree, there is installed a mold pick-up and tilting mechanism which is pivotally mounted upon a supporting frame straddling the conveyor. An anvil or buffer is rigidly carried by the frame, and the tilting mechanism is so constructed as to release the molds at a point in their arc of pivotal movement whereby they will fall under the influence of gravity upon the anvil and thus dislodge the ingots which are guided along a chute into the bosh. The empty molds are then returned to their normal positions by the tilting device. The mold dumping mechanism is operated in both its discharging and return movements by means of a pneumatic motor comprising an air cylinder and a cooperating piston which is connected to the pivoted mold engaging members. Automatically actuated choke valves are provided for controlling the exhaust from the cylinder in order to cushion the device at certain points during its movement in either direction.

The admission of air to the cylinder is controlled by certain electrically operated valve means actuated by limit switches adapted to be thrown by the intermittent driving of the mold conveyor; and an electrical interlocking system is provided to prevent the actuation of the mold dumping apparatus during the movement of the conveyor, and conversely, to prevent the resumption of movement of the conveyor while the dumping mechanism is in motion.

As a further feature of the invention, the mechanical mold handling device is so arranged as to enable the removal of the ingots manually, when desired, by lifting and rotating the mold by hand, knocking out the ingot and returning the empty mold to its place on the conveyor.

Other objects and features of novelty will be apparent from the following specification when read in connection with the accompanying drawings in which one embodiment of my invention is illustrated by way of example.

In the drawings,

Figure 1 is a plan view of the delivery end of a casting machine embodying the principles of the present invention; this view also showing a portion of the bosh and its conveyor, as well as the automatic mold dumping apparatus, portions of the latter, including certain valves and piping, being omitted for the sake of clearness of illustration of the principal parts of the machine;

Figure 2 is a somewhat diagrammatic vertical transverse sectional view, taken on line 2—2 of Figure 1, on a slightly reduced scale, showing the relative positions of and cooperation between the casting machine and the bosh;

Figure 3 is a plan view of the mold discharging or dumping apparatus, on an enlarged scale;

Figure 4 is a vertical sectional view through the dumping apparatus, taken substantially on line 4—4 of Figure 3;

Figure 5 is a fragmentary vertical sectional view similar to Figure 4 and showing certain of the moving parts in different positions;

Figure 6 is a vertical sectional view taken transversely of the dumping apparatus, as on line 6—6 of Figure 4;

Figure 7 is a transverse sectional view, taken on line 7—7 of Figure 4;

Figure 8 is a fragmentary sectional view, taken on line 8—8 of Figure 4;

Figure 9 is a fragmentary sectional view, taken on line 9—9 of Figure 8;

Figure 10 is a fragmentary view in end elevation of the parts shown in Figure 8, as viewed from the left hand side thereof;

Figure 11 is an enlarged plan view of the pneumatic actuating mechanism of the dumper;

Figure 12 is a transverse sectional view, taken on line 12—12 of Figure 11;

Figure 13 is a view in side elevation of the solenoid actuating valve, a portion thereof being shown in vertical section;

Figure 14 is a horizontal sectional view of one of the exhaust choke valves;

Figures 15 and 16 are diagrammatic perspective views of the actuating cylinder and air connections, during the forward and return strokes of the piston respectively;

Figure 17 is a diagram of the electrical connections for the dumper actuating mechanism;

Figures 18 and 19 are diagrams showing various angular positions of a mold and associated mechanism during the dumping and return portions of its cycle of movement; and Figure 20 is a chart showing the effective pressures in the actuating cylinder at various points during the dumping and return strokes.

In foundry installations of this exemplary type, the casting machine comprises a straight-line endless chain conveyor which supports a large number of molds and is arranged to carry them successively past the pouring ladle from which they receive the molten metal, and thence toward the discharge end of the machine where the molds arrive at the time the castings or ingots have solidified, and have cooled to some extent. The pouring end of the casting machine is not shown in the accompanying drawings since it forms no essential part of the present improvement. The general arrangement of the discharge end of the casting machine is shown very clearly in Figures 1 and 2 of the drawings in which the casting machine is designated generally by the reference character A, the machine comprising principally an endless conveyor supporting a series of pivotally arranged molds, and adapted to move in the direction of the arrow $a$. The conveyor passes over sprocket wheels of conventional construction at the end thereof, and these sprocket wheels are driven through the driving and transmission mechanism indicated generally by the reference character B. The bosh or quenching tank C is disposed alongside of and parallel with the casting machine A and is provided with a conveyor D adapted to receive the ingots from the casting machine and carry them off in the direction of the arrow $b$ for subsequent handling and inspection. The ingots or castings are delivered to the bosh conveyor D along the chute E into which they are dumped by means of the mold discharging apparatus indicated generally by the reference character F and comprising the principal part of the present invention. The letter G has been used to designate generally the pneumatic and electrical operating mechanism for the mold dumping device.

The casting machine

The casting machine proper, together with the associated bosh for quenching the ingots, will now be described in more detail. A supporting framework 10, which may be constructed of suitable rolled shapes, surmounts a base 11, which may be made of concrete or masonry. Disposed longitudinally of the casting machine, and resting upon the frame 10, are the I-beams 12 which serve to support the rails 15 upon which the mold conveyor is adapted to run. The conveyor itself comprises a large number of mold supporting chairs 16 which are secured at their ends to the inner series of chain links 17, these links being pivoted together and also connected to the outer series of links 18 by means of the stub axles 19 which span the two series of links upon each side of the conveyor and are supported by the small flanged wheels 20 which run upon the rails 15. The chain conveyor thus comprised passes around the pair of sprocket wheels 22 secured to the main driving shaft 25, and the chairs, together with their supported molds, pass along the return portion of the conveyor in an inverted position back to the pouring end of the machine.

The drive shaft 25 is driven by the motor 27, to the shaft 28 of which is applied the magnetic brake 29. A flexible shear pin coupling 30 serves to connect the motor shaft 28 with the in-put shaft 31 of the speed reducing gear stand 32. The sprocket gear drive shaft is connected with the out-put shaft of the reducing gearing by means of the coupling 33. The electrical driving and controlling apparatus further includes the motor generator set 35 which is suitably connected with the other electrical units of the installation, as will be later described. Each of the mold supporting chairs 16 is provided with an upwardly projecting bracket 36 which carry the pintles 40 upon which the arms 45 of the molds 50 are pivoted. Each of the molds 50 are provided with feet 51 which rest upon the upper surface of the chairs 16, and a pair of parallel arms 52 extend from the end of each of the molds opposite to that upon which the arms 45 are formed. A pin 55 extends between the arms 52 and serves as the point of connection between the molds and the tilting hooks of the dumping device and also with the latch member which retains the mold in position upon the conveyor at all times, except when it is being discharged.

In the preferred embodiment, the molds are both filled from the pouring ladle and discharged at the dumping end of the casting machine in groups of four, although this practice may be varied to suit local conditions and preferances. As more clearly shown in Figures 3 and 6 of the drawings, each successive group of four molds are brought within the sphere of operation of the dumping device by the intermittent actuation of the casting machine. Each group of molds are lifted and tilted by the discharging apparatus F about their pivots 40 from the solid-line position in Figure 4 to the position shown in broken lines in that figure, or to the position indicated in Figure 2 of the drawings. The ingots I are dislodged from the molds 50 and fall upon the bottom plates 56 of the chute E. The chute E is also provided with side plates 57 and the bottom plates 56 are provided with a screened opening 58 communicating with a chute 59 through which any scale knocked loose from the ingots may fall. The ingot slides down the chute E and is discharged into the bosh or quenching tank C onto the bosh conveyor D which is disposed beneath the level of the cooling liquid therein. The bosh conveyor D is an endless chain conveyor, the upper run of which is supported upon the framework 60 and the lower run of which is carried by the supporting structure 61. The conveyor D comprises the chain links 62 supported by the rollers 63 and carrying the flights 64 which serve to drag the ingots through the bosh and deliver them at the discharge end of the conveyor.

The arrangement of the casting machine and bosh which has just been described provides a very convenient installation in that the bosh conveyor receives the ingots from the dumping device transversely of the casting machine conveyor and may be disposed at a height just a little below that of the latter. Therefore, the bosh may be disposed upon the working floor and the necessity for excavating beneath the casting machine for the installation thereof is obviated.

The mold dumping device

The device for discharging the ingots I from the molds 50, which has been designated with the reference character F, will now be described. This apparatus is a substantially self-contained unit applied to the casting machine A adjacent the end thereof remote from the pouring ladle and is illustrated in its entirety in Figures 1, 3, and 4 of the drawings. A main supporting frame for the dumping device is composed of the parallel channel beams 70 which are supported upon the stands 72, and straddles both the casting machine conveyor and the bosh.

The immediate support for the mold lifting and dumping device is supplied by the large U-shaped casting 75 which is shown in plan in Figure 3, and in longitudinal section in Figure 4; two transverse sections through the member 75 being illustrated in Figures 6 and 7. The upper substantially rectangular framing portion 76 of the casting 75 is of an outwardly facing channel shape in cross-section, and the side portions thereof rest upon the parallel channel beams 70 of the supporting frame. From this upper framing portion of the member 75 there depend two sides plates or webs 77 upon which are formed the arcuate under-cut guide grooves 78 formed by the overhanging curved flanges 79 projecting inwardly from the webs 77. These guides are concentric with the pintles 40 about which the molds 50 are swung during the dumping operation.

The mold dumping member proper is indicated generally by the reference numeral 80 and comprises a pair of side frames 81 and a connecting bail or cross-tie element 82. Each of the side frames 81 has affixed to the lower portion thereof the glides or shoes 85 as by means of the bolts 86. These shoes are of the same curvature as the guides 79 on the member 75 and are adapted to move within the grooves 78 during the dumping and return movements of the member 80. Each of the side frames 81 of the dumping member are provided with the crank pins 90 to which are connected the side members 92 of the yoke 95, the transverse or crosshead portion 96 of which is secured upon the threaded end of the operating piston 98 as by means of the nuts 99.

During the normal progress of the molds 50 along the casting machine, they are retained in horizontal position,—both between the pouring ladle and the dumping device, when filled with metal, and when returning empty in inverted position on the underside of the machine—by means of the latch or retaining members 100. Each of these members comprises essentially the substantially L-shaped hook members 101 provided with a block 102 which carries the trunnion or pintle 103 rotatably mounted in a depending clip 104 carried by the chair 16. The upper end of the member 101 is provided with a hook 105 which is adapted normally to engage around the pin 55 to thus retain the mold in the position shown in solid lines in Figure 4. However, when the four molds that are to be discharged arrive within the confines of the dumping apparatus, the latch members 101 for each of these molds are retracted to released position as shown in Figure 4. In order to normally retain the latch in engaged position and in order to effect its release, there is provided an elongated cam track 110 paralleling the course of the conveyor A and supported by the brackets 111. Throughout the length of the conveyor, except at the dumping position shown in Figure 4, this cam track is disposed in a vertical plane, but at the dumping position, as most clearly shown in Figures 4 and 6 of the drawings, the track 110 is warped to an offset inclined position indicated at c. Straddling the cam track 110 are a pair of rollers 112 rotatably mounted upon the pins 113 carried upon the horizontal portion of the latch element 101, and these rollers, as will be readily seen, serve to tilt the latch member when they arrive at the offset position c of the cam track.

Referring to the general view of Figure 4, and also to the more detailed illustrations in Figures 7-10 inclusive, it will be seen that the lifting and dumping member 80 is provided with sets of four upper and lower lifting hooks 115 and 116 respectively. The upper hooks 115 are riveted to the plates 117 which are in turn secured to the rocking cross bars 118, and the lower hooks 116 are similarly secured to the plates 119 which are carried by the bars 120. The opposite ends of the bars 118 and 120 are provided with trunnions 121 and 122 respectively, which are rotatably disposed in slightly widened portions 123 of the bail 81, 82 of the lifting member 80. The rocking bars 118 and 120, at one side of the device, are provided with the cylindrical portions 125 and 126, which are formed between the trunnion ends 121 and 122 and the main portion of the rocking bars. The cylindrical portion 126 of the bar 120 passes through one end of the cam roller lever 130 which is provided with a boss 131 to which the bar portion 126 is rigidly secured as by means of the set bolt 132. An elongated slot 134 is formed in an intermediate portion of the lever 130 to accommodate the attenuated end 125 of the rocking bar 118. The inner end of the lever 130 is provided with the stub shaft or axle 135 which carries the cam roller 136 upon its outwardly projecting end. The cam roller 136 is guided within the cam slot 137 formed in the stationary cam segment 140. The segment 140 is supported at one end directly from the upper portion 76 of the casting 75 by means of the bolt 141 and at its opposite end by means of the bracket 142 carried by the shelf 143 formed on the member 75. The cam is secured to this bracket 142 by means of the bolt 145. At the left hand end of the cam segment 140, the cam slot 137 is provided with a somewhat abrupt downwardly or inwardly projecting portion 150 into which the roller 136 is guided at the extreme retracted position of the lifting and dumping member 80. At this point, the cam roller lever 130 is moved in a counter-clockwise direction about the trunnion 122 as viewed in Figure 10 of the drawings. This causes the lower hook carrying cross-bar 120 to rotate about its trunnion 122 in a clockwise direction as viewed in Figures 4 to 9 of the drawings. The cross-bar 120 is provided with gear teeth 152 near the ends thereof which mesh with the gear teeth 153 formed on the adjacent surfaces of the upper hook-carrying bars 118. There are of course at each end of these bars only one gear tooth on the member 120 and two upon the member 118. However, the gear teeth are so designed that if the surfaces of the bars upon which they are formed were continued for a full circle, there would be 12 teeth in the upper and 24 teeth in the lower "gear."

This arrangement insures that upon the movement in one direction of the lower bar 120, the upper bar 118 will be rotated about its trunnions 121 in the opposite direction, and in the movement just described, as effected by the passage of the cam roller 136 into the portion 150 of the cam slot 137, both of the bars 118 and 120, together with their hooks 115 and 116 will be rotated to the position shown in Figure 4 in which the ends of both sets of hooks are moved to disengaged position with respect to the mold pins 55. Upon actuation of the lifting member 80 in a clockwise direction as viewed in Figures 4 and 5 in order to dump the molds, the cam roller 136 moves out of the end portion 150 and into the main arcuate portion of the slot 137 which is concentric with the mold pintle 40 but disposed at a greater distance from that center than the portion 150. This has the immediate effect of rotating the bars 118 and 120 in opposite directions to move the hooks 115 and 116 inwardly so that they lie in the path of the mold pins 55, the hook 116 engaging the pin 55 and lifting the mold 50 toward dumping position as clearly shown in Figure 5 of the drawings.

When the molds 50 reach the vertical dead center position, they are carried forwardly and downwardly under the influence of gravity more rapidly than the hooks 116, and when the molds reach the position shown in broken lines in Figure 4, the arms 52 strike the anvil or buffer 155 and the inertia of the ingots cause them to be discharged from the mold into the chute E. The anvil 155 is preferably formed chiefly of metal and is carried in the inclined brackets 156 bolted as at 157 to the frame members 70. Member 155 is backed up by a soft rubber blocking 158 as a shock absorber and means to diminish vibration, and is provided with the recesses 159 to accommodate the ends of the hooks 115, at their forward limiting positions. Upon the return movement of the lifting member 80 which is effected through the piston rod 98 and yoke 95, as will be more specifically described, the return hooks 115 are brought into engagement with the mold pins 55 and the empty mold is thus started toward its normal position on the mold supporting chair 16 of the conveyor. Again, when passing the vertical dead center position, the molds leave the hooks 115 and fall freely until the pins 55 contact with the descending dumping hooks 116. This contact is cushioned by means which will be described, and the molds are then lowered gently to their original positions by means of the hooks 116 which are released when the cam roller reaches the portion 150 of the cam slot 137. After this, by suitably synchronized electrical control devices, the casting machine conveyor is moved forwardly until the next set of four molds is brought to dumping position within the discharge apparatus F. The empty molds as they proceed from dumping position are again latched to the chairs 16 when the latch members 100 move onto the normal vertical run of the cam track 110. In the meantime the next set of molds have been unlatched from their chairs by means of the canted portion of the track 110 at c.

*The operating mechanism for mold dumping device*

The means for operating the mold discharge device is designated generally by the reference character G and is best illustrated in Figures 3, 4, and 11–17 of the drawings. Referring more particularly to Figures 3 and 4, it will be seen that there is mounted upon the left hand end of the trestle or supporting frame 70, 72 of the discharge device F, a platform 160 which carries the supporting member 162 for the trunnions 163 of the pneumatic actuating cylinder 165. The bracket member 162 is provided with the upstanding trunnion supporting projections 166 and is adjustable longitudinally of the dumping mechanism by means of the threaded bolts 167 carried by the ears 168 and locked in adjusted position by means of the lock nuts 169. The cylinder 165 is provided with the rearward and forward heads 170 and 171 respectively, suitable packing arrangements being provided for the piston rod 98 which passes through the head 171 and has secured to the inner end thereof the piston 175. Adjacent the trunnions 163 of the cylinder, the latter is provided with an annular shouldered portion 177, and mounted upon the trunnions inwardly upon the supports 166 are the yoke-like bracket members 178 and 179; the downwardly projecting ends of these bracket members are secured together by means of the bolt 180 and are adapted to clamp between them the plate or clip 181 which is notched in its upper edge as at 182 to receive the flange 177. By this means the brackets 178 and 179 are rigidly supported by the cylinder 175 and are constrained to partake of its rocking movements during the operation of the discharging apparatus. The brackets 178 and 179 serve to support upon either side of the cylinder 165 the shelves or platforms 185 and 186 respectively.

Upon these platforms are secured certain pneumatic and electrical accessories employed in the actuation of the operating mechanism. Upon the shelf or platform 185 is supported the choke valve 190, and a limit switch 192 is secured to the upstanding plate 193 formed on or carried by the shelf 185. Upon the shelf 186 at the other side of the cylinder 165 there is also disposed a choke valve 195, and from beneath this shelf there is suspended the air cylinder interlock limit switch 196, the purpose and function of which will be described at a later point in the specification. Projecting upwardly from the bracket 179 is the supporting plate 197 which carries the pins 198 upon which the upper and lower flanged rollers 199 are rotatably supported. These rollers embrace and roll upon the upper and lower surfaces of the actuating bar 200. This bar is pivotally supported as at 201 upon the brackets 202 carried by the crosshead 96 of the yoke 95 which is reciprocated by means of the piston rod 98. The actuating bar 200 extends above and parallel with the piston rod 98 and is adapted to partake of the same movements as that member. At a point near its rear end, the bar 200 is provided with a stop or actuator 205 which is adapted to contact with the trigger 206 of the limit switch 192. Near the forward end of the bar 200, another stop or actuator 207' is carried and this element is adapted to contact with the trigger or arm 207 of the switch member 196. The bar 200 is also furnished with cam members 210 and 212 which actuate the exhaust choke valves 190 and 195 at certain points during the movement of the piston and parts carried thereby.

At this point, it will be well to describe the piping and connections by means of which the air under pressure is supplied to and exhausted from the actuating cylinder 165. The cylinder 165 and piston 175 comprise a pneumatic motor by means of which the dumping device is operated and certain appropriately positioned valves and connections are provided to admit the motive fluid to opposite ends of the cylinder for moving the piston in dumping and retracting directions. The compressed air is supplied by a compressor of suitable type (not shown) through the pipe or conduit 215, in which there is disposed a cut-off valve 216 and a needle valve 217. The conduit 215 is connected with the inlet passageway 218 of the solenoid valve 220 and the conduits 221 and 222 lead from the passages 223 and 224 respectively of the solenoid valve toward the rear and forward heads of the cylinder 165. A venting conduit 225 connects the exhaust passageway 226 of the solenoid valve with the atmosphere.

The specific details of the solenoid valve 220 form no particular part of the present invention and any suitable double valve arrangement of similar type may be employed, although it is preferred that the valve be actuated electrically.

The solenoid valve employed in the preferred embodiment is illustrated in some detail in Figure 13 of the drawings. Within the valve casing there are provided the two chambers 230 and 231, within which are adapted to reciprocate the hollow piston valve elements 232 and 233. The valve stems 234 and 235 are pivoted to the rocking lever 236 which is fulcrumed as at 237 to a bracket on the valve cover plate 238. The ends of the lever 236 are connected by means of the links 239 to the respective solenoid cores 240 and 241 which are received within the coils 242 and 243 of the actuating solenoids. The inlet passageway 218 of the valve leads to an inlet chamber 245 and the vent passageway 226 leads to an exhaust chamber 246. The respective passageways 223 and 224 which are in communication with the rear and forward ends of the cylinder communicate with the elongated chambers or manifolds 248 and 249 within the valve casing. The piston valve members 232 and 233 are each provided with oppositely disposed lower side orifices and with an upper orifice in its inner wall. The inlet chamber 245 and vent chamber 246 are each provided with oppositely disposed orifices and the manifold chambers 248 and 249 are provided with elongated slots in their inner walls.

As clearly shown in Figure 13, when one of the valves is in its uppermost position, as that occupied by the right hand valve in this figure, the orifices are in such register that the inlet chamber 245 and the chamber 249 communicating with the forward end of the cylinder are in communication and the valve body 233 is cut off from communication with the vent chamber 246. On the other side of the valve assembly the orifices of the piston valve 232 are so disposed that the chamber 248 communicating with the rear end of the cylinder is in communication with the exhaust chamber 246 and not with the pressure chamber 245. Thus, with this setting of the solenoid valve as attained by the energizing of the solenoid coil 242, the head end of the cylinder is under pressure and the rear end is exhausted to the atmosphere. Upon energizing the solenoid coil 243, the positions of the valves will be reversed and the rear end of the cylinder will be placed under pressure and the forward end exhausted.

Referring to the plan view of the pneumatic system in Figure 11 and at the same time to the diagrammatic views in Figures 15 and 16, the air conduits will be traced from the solenoid valve 220 to the respective ends of the cylinder 165. The conduit 221 leading toward the rear end of the cylinder is connected by means of the T-coupling 250 with the conduit portions 251 and 252. In the section 251 there is disposed the swing check valve 255, and in the conduit 252 is interposed adjustable check valve 256. From the adjustable check valve the conduit 252 leads to the choke valve 195 to which it is connected by means of the nipple 258. Beyond the check valve 255 the conduit 251 is connected by means of the three-way coupling 259 with the pipe 260 leading to the nipple 261 of the choke valve 195, and with the connection 262 leading into the rear head of the cylinder 165.

The conduit 222 leading from the chamber 249 of the solenoid valve toward the forward end of the pneumatic cylinder is connected by means of the three-way coupling 265 with the pipe 266 which leads to the nipple 267 of the choke valve 190, and it is also connected with the pipe line 268 which communicates with the forward end of the cylinder 165. In the pipe section 266 there is disposed an adjustable check valve 270 corresponding to the check valve 256 on the other side of the cylinder, and in the line 268 a swing check valve 271 is interposed for the same purpose as the valve 255 in the opposite connections. A pipe 272 connects the nipple 273 of the choke valve 190 with the line 268 near the point where it enters the forward end of the cylinder 165. In order to accommodate these various connections to the tilting movement of the cylinder and its associated piping and valves, flexible sections 274 and 275 are inserted in the conduits 221 and 222 respectively.

The choke valves 190 and 195 are of identical construction and are illustrated in section in Figure 14 of the drawings. However, the precise details of these valves are of conventional construction and form no part of the present invention per se. From an inspection of this figure it will be seen that each of the valves are provided with a central chamber, the two portions 280 and 281 of which are separated by an annular internal shoulder 282. A hollow piston valve member 285 is adapted to reciprocate within the chamber and is urged toward the lower part of Figure 14 by means of the coil spring 286 which is seated within the recess 287 in the piston valve member and bears against the cap 288 threaded in one end of the valve casing. The opposite end 289 of the valve member 285 abuts the cam projection 290 on the lever arm 292 which is pivoted at 293 upon a portion of the valve casing. A roller 295 is carried by this arm and is adapted to be contacted by the cam elements 210 or 212 carried by the actuating bar 200. A bracket 296 overlies the forward end 297 of the lever 292 and limits its outward movement. The valve body member 285 is provided with a hollow inner chamber 298 and the wall of the member is provided with spaced annular series of perforations 299 and 300. Suitable packing rings are provided at the ends of the valve chamber and at the intermediate shoulder 282.

The operation of the choke valves will be readily understood from an inspection of Figure 14. When the exhaust pressure from the cylinder 165 is admitted to the nipples 261 or 272, and the valve member is in its uncammed position as shown in Figure 14, the fluid will pass from the valve chamber portion 281 through the openings 299 into the interior chamber 298 of the piston valve, and thence through the openings 300 into the chamber 280 and then out through the nipples 258, 267. Upon actuation of the valve by means of one of the cam elements 210 or 212 on the arm 200, the piston 285 will be depressed by the arm 292, and the openings 299 will pass inwardly beyond the packed shoulder 282, and thus the exhaust line will be effectively choked. This actuation of the valve is effected to accomplish certain cushioning functions in connection with the operation of the dumping mechanism, as will be later described.

Operation

The general function and operation of the principal parts of the casting machine, the bosh conveyor, and the ingot dumping mechanism have already been described, but there remains to be explained the sequence of operations of the pneumatic and the electrical actuating mechanism in accomplishing certain of the movements of the dumping device.

In order to initiate each dumping cycle as the succeeding groups of four molds arrive at dumping position, there is provided a limit switch 320 which is shown diagrammatically in Figures 1, 11, and 17 of the drawings. This switch is of the cam type and is provided with an actuating shaft 321 upon which there is fixed a sprocket wheel 322 driven by means of the chain 323 from a similar sprocket 324 fixed to the conveyor head shaft 25 of the casting machine. Upon a movement of the conveyor corresponding to the length of four molds, the switch 320 is actuated to cause the conveyor to stop and to simultaneously energize the coil 243 of the solenoid valve 220. This effects the actuation of the valve from its position as shown in Figure 13 to the opposite position which will cause the compressed air to flow through the conduit 221, through the swing check valve 255, and into the rearward head 170 of the cylinder through the pipe 262. The air pressure building up behind the piston 175 causes the piston rod 98 and the yoke 95 to move forwardly and initiate the action of the mold dumping device, the hooks 116 engaging the molds and then swinging them upwardly toward their vertical position. The valve and switch actuating bar 200 carried by the yoke 95 and guided upon the rollers 199 moves forwardly with the piston, and immediately the actuating pin 206 throws the interlocking limit switch 196 which insures that the conveyor cannot be restarted during the operation of the dumper. During this initial portion of the movement of the piston 175, air is being exhausted from the forward end of the cylinder through the pipe 272, the choke valve 190, the adjustable check valve 270, conduit 222, and the exhaust chambers of the solenoid valve 220.

As the dumping device 80 carries the molds beyond the vertical dead center position, they are permitted to fall upon the anvil 155 and the ingots are thus jarred loose therefrom. As the dumping device 80 moves beyond this position, it too moves more freely under the influence of gravity, and means are provided for cushioning its movement toward its end position. As the device nears this end position, the cam elements 210 on the bar 200 contact with the roller 295 of the actuating arm of the choke valve 190 and close this valve, thus temporarily preventing the exhaust of air from the forward end of the cylinder and effectively cushioning the fall of the dumping device. After the cam surface 325 of the cam member 210 passes the roller 295, the cylinder is permitted to exhaust normally, as permitted by the adjustable check valve 270, up to the end of the stroke.

At substantially the end of the stroke of the piston, the actuating pin 205 on the bar 200 contacts with the trigger 206 of the reversing limit switch 192, and this actuation causes the opposite solenoid coil 242 to be energized and the solenoid valve brought back to the position shown in Figure 13. This reverses the flow of the compressed air, causing it to pass through the conduit 222, the check valve 271, and the piping 268, into the forward end of the cylinder in front of the piston 175. As the piston moves rearwardly, the air is exhausted from the rear end of the cylinder through the pipe 262, the pipe 260, the choke valve 195, the pipe 252, the adjustable check valve 256, the conduit 221, and the exhaust chambers of the solenoid valve.

As the dumping device 80 approaches its midportion in returning the empty molds to their place on the conveyor, the speed of operation must be reduced to a slight extent preparatory to the release of the molds from the hooks 115 from which the molds fall by gravity to their contact with the hooks 116. In order to effect this reduction in speed, the cam surface 327 of the cam 212 closes the choke valve 195 and prevents the exhaust of air from the rear end of the cylinder for a short period of time. Then, as the device passes its mid-portion and an instant before the molds have fallen into contact with the hooks 116, the exhaust from the rear end of the cylinder is again choked by means of the cam portion 328 coming into contact with the actuating roller of the choke valve 195. This effectively cushions the blow resulting from the contact of the molds with the hooks 116, and thereafter the normal exhaust of the air through the adjustable check valve 256 permits the device to return the molds to their horizontal position upon the conveyor.

As the piston 175 nears the rearward end of the cylinder, the actuating pin 206 reverses the operation of the interlocking limit switch 196 and permits the conveyor to resume its movement for the length of four more molds, whereupon the limit switch 320 again initiates the cycle of movement of the dumping mechanism.

The diagrammatic views in Figures 18, 19, and 20 of the drawings illustrate the operation of the device very clearly. In Figure 18 the normal position of the mold 50 on the conveyor is shown in solid lines, and in this position the dumper actuating crank pin 90 is disposed at a point approximately 55° clockwise from the horizontal. As the mold passes the 90° point, it begins to fall toward the right and the pin 55 of the mold handle leaves the hooks 116. The speed of the lifting mechanism 80 is so controlled that the hook end of the short hooks 115 are slightly in advance of the molds, and they pass into the recesses 159 in the anvil 155 before the molds strike the edge of the latter. The final position of the crank pin 90 is at approximately 155° from the starting point.

Referring to the pressure diagram in Figure 20, it will be seen that the initial pressure on the rear side of the piston rises rapidly to a maximum, from whence it falls off gradually as the dumping device moves forwardly until the crank pin reaches the 135° mark. At this point the choke valve 190 is closed, and the pressure upon the other side of the piston builds up in order to cushion the dumping mechanism at the end of its forward stroke. Upon the return stroke the actuating pressure does not need to be so high, since the molds are now empty, and the pressure gradually falls off until the crank pin 90 reaches the 125° point, whereupon the choke valve 195 is closed momentarily in order to retard the movement of the mechanism to some extent. Just beyond this point the molds begin to fall toward the left, that is, from the hooks 115 toward the hooks 116. Substantially simultaneously with the contact of the pin 55 of the molds with the hooks 116, the choke valve 195 is again closed in order to cushion the device when the hooks 116 are struck by the molds. This point is clearly shown at the 95° mark on the chart in Figure 20. Then the valve 195 is opened and the normal rate of exhaust of the cylinder continues to the intial point.

It will be noted that due to the automatic release of the lifting hooks of the mold handling device 80, provision is made for the removal of the ingot castings from the molds manually if so desired; all of the molds in a set, or any one of them, being lifted and inverted by hand, the ingot knocked out, and the empty mold dropped back into place on the conveyor line.

The wiring diagram shown in Figure 17 is self-explanatory and represents the preferred manner of connecting the various electrical units, but, of course, variations in these connections may be made within the broad scope of the invention.

It is also apparent that this dumping mechanism is adaptable without great modification to horizontally disposed casting wheels, and also to casting installations having a stationary mold line-up and portable pouring equipment. Furthermore, it is obvious that in cases where the metal ingots do not have to be quenched by total immersion, the bosh tank shown may be omitted and other suitable treating or receiving means provided.

It is also understood that various changes and modifications may be made in the embodiment illustrated and described herein without departing from the scope of the invention as defined in the following claims.

Having thus described the invention, what is claimed as new and desired to be secured by Letters Patent is:

1. A foundry installation comprising, in combination, a straight line casting machine which comprises an endless conveyor carrying a plurality of molds from a pouring station, said molds being pivoted to said conveyor for arcuate movement in a plane transverse to their line of movement along said conveyor, means disposed adjacent said conveyor at a point remote from said pouring station for lifting said molds upwardly about their pivots and letting them fall from the highest point of their arc of movement, an anvil against which said molds are allowed to fall in order to dislodge the castings, and a chute for receiving said castings from said molds and transporting them to a receptacle, said chute being provided with a screen across which said castings move and through which any scale may pass.

2. In combination with a casting machine having a mold pivotally carried thereon so as to be capable of dumping movement in a substantially vertical plane, a mold discharging device comprising a pivoted member provided with grappling means for swinging said mold about its pivot to and from dumping position, said grappling means providing a lost-motion connection with the mold, whereby during a portion of the swing movement the mold may move freely under the influence of gravity independently of the pivoted member.

3. For use in connection with a casting machine carrying pivoted molds and mounted upon a supporting frame, a substantially self-contained mold discharging device embodying means for engaging said molds and moving them about their pivots, and means for jarring the molds to remove the castings therefrom, said device being mounted independently of said casting machine upon an entirely separate supporting base, whereby the casting machine is relieved from the shock incidental to the jarring of the molds.

4. In a casting machine, in combination, a power driven conveyor carrying a plurality of molds, a mold discharging device comprising a movable member adapted to effect the ejection of the castings from the molds and to return to its initial position, a reversible fluid pressure motor for operating said member in either direction of movement, said motor comprising a cylinder having fluid connections at each end thereof, and a piston reciprocable therein and operatively connected with said member, means for controlling the supplying of motive fluid alternately to the ends of said cylinder, and means for controlling the rate of exhaustion of motive fluid from the opposite ends of said cylinder ahead of said piston to control the speed of movement of said member.

5. In combination with a casting machine comprising a power driven conveyor carrying a plurality of molds, a mold discharging device comprising a movable member adapted to effect the ejection of the castings from said molds and to return to its initial position, a reversible fluid pressure motor for operating said member in either direction of movement, said motor comprising a cylinder having fluid connections at each end thereof, and a piston reciprocable therein and operatively connected with said member, automatic electrically actuated means for controlling the supplying of motive fluid alternately to the ends of said cylinder, and automatic means for controlling the rate of exhaustion of motive fluid from the opposite ends of said cylinder ahead of said piston to control the speed of movement of said member, and to effect a cushioning thereof at certain points in its cycle of operation, said last named means being movable in unison with said piston.

6. In a foundry installation of the class described, in combination, a casting machine embodying a movable conveyor carrying a plurality of molds thereon and power means for driving said conveyor, a mold discharging device associated with said conveyor and comprising an oscillatable mold handling member movable in one direction to discharge a casting from a mold and in the reverse direction to return to its initial position, a reversible motor for operating said member in either direction of movement, an electrically actuated device for alternately actuating said motor in each direction, a limit switch adapted to be thrown periodically upon the completion of a predetermined travel of the conveyor to stop the conveyor and to actuate said reversible motor in mold discharging direction, and another limit switch adapted to be thrown by a portion of said member upon completion of the mold discharging movement to reverse said motor to effect the return stroke.

7. In a foundry installation of the class described, in combination, a casting machine, a mold mounted thereon, a mold discharging device associated with said casting machine and comprising an oscillatable mold handling member movable in one direction to discharge a casting from the mold and in the reverse direction to return to its initial position, and a fluid pressure motor for operating said member comprising a cylinder having fluid connections at each end thereof, and a piston reciprocable therein and operatively connected with said member, a reversible valve for alternately supplying pressure fluid to the respective ends of said cylinder to effect the discharging and return movements of said piston and member, and choke valves controlling the exhaust of pressure fluid from the opposite end of said cylinder from that to which the fluid is being admitted.

8. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, and a fluid pressure motor for operating said member comprising a cylinder having fluid connections at each end thereof, and a piston reciprocable therein and pivotally connected with said oscillatable member, a reversible valve for alternately supplying pressure fluid to the respective ends of said cylinder to effect the discharging and return movements of said piston and member, choke valves controlling the exhaust of pressure fluid from the opposite end of said cylinder from that to which the fluid is being admitted, means movable with said oscillatable mold discharging member for effecting the actuation of said reversible valve as the member reaches the end of its stroke, and means also movable with said member for closing said choke valves during portions of the forward and return strokes of said member to cushion the operation thereof.

9. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, said member comprising a bail-like or substantially U-shaped frame mounted adjacent the ends of its arms for rotation in a vertical plane concentrically with the pivot of said mold, and grappling means on said frame for engaging said mold during its rotative movement under the influence of said member.

10. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, said member comprising a bail-like or substantially U-shaped frame mounted adjacent the ends of its arms for rotation in a vertical plane concentrically with the pivot of said mold, a pair of hook elements on said frame disposed so as to extend in opposite directions and opening toward each other, one of said hooks adapted to engage a mold during the upward swing of the frame and mold in mold dumping direction and the other in mold returning direction, the mold passing from the control of one of said hooks to that of the other as it passes the upper dead-center position of its arc of movement.

11. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, a pair of hook elements on said member disposed so as to extend in opposite directions and opening toward each other, one of said hooks adapted to engage a mold during the upward swing of the member and mold in mold dumping direction and the other in mold returning direction, the mold being free to fall away from one of said hooks toward the other as it passes the upper dead-center position of its arc of movement in either direction, an anvil disposed in the path of free movement of the mold in the dumping direction for dislodging the casting therefrom, the mold falling from contact with one of said hooks into contact with the other during movement in the other direction.

12. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, a pair of hook elements on said member, spaced apart in the direction of movement of said member, disposed so as to extend in opposite directions and opening toward each other, one of said hooks adapted to engage a mold during the upward swing of the member and mold in mold dumping direction and the other in mold returning direction, the mold being free to fall away from one of said hooks toward the other as it passes the upper dead-center position of its arc of movement in either direction, an anvil disposed in the path of free movement of the mold in the dumping direction for dislodging the casting therefrom, the mold falling from contact with one of said hooks into contact with the other during movement in the other direction, a fluid pressure motor operatively connected with said member for effecting the movement of said member in either direction, and embodying means for cushioning the movement of said member toward its end position in dumping direction, and for cushioning the fall of said mold upon the hook element in the return direction.

13. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, said member comprising a bail-like or substantially U-shaped frame mounted adjacent the ends of its arms for rotation in a vertical plane concentrically with the pivot of said mold, grappling means on said frame for engaging said mold during its rotative movement under the influence of said member, a stationary cam track adjacent said frame, means on said grappling means for contacting said cam track whereby said grappling means are opened to release the mold as the frame approaches one end of its travel and are closed to engage the mold as it leaves said end.

14. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom, and in the reverse direction to return the mold to its initial position on the machine, grappling means on said member for engaging said mold during its rotative movement under the influence of said member, said grappling means comprising a pair of hook elements mounted on said member so as to extend in opposite directions and opening toward each other, the bights of said hooks being spaced apart to permit free movement of said mold from one hook toward the other at certain points in the cycle of operation, said hooks being connected together for relative pivotal movement in opposite directions, cam actuated means on said grappling means for swinging said hooks in opposite directions away from the path of said mold to release it and toward said path to engage said mold, and cam means for actuating said cam actuated means.

15. In a foundry installation of the class described, in combination, a casting machine, a mold mounted thereon for pivotal dumping movement in a vertical plane, a mold discharging device associated with said casting machine and comprising an oscillatable mold handling member movable in one direction to rotate the mold about its pivot point to discharge a casting therefrom and in the reverse direction to return the mold to its initial position on the machine, said member comprising a bail-like or substantially U-shaped frame mounted adjacent the ends of its arms for rotation in a vertical plane concentrically with the pivot of said mold, a pair of hook elements on said frame disposed so as to extend in opposite directions and opening toward each other, one of said hooks adapted to engage a mold during the upward swing of the frame and mold in mold dumping direction and the other in mold returning direction, each of said hooks being carried by one of a pair of parallel cross bars having their ends pivoted in the side arms of said frame and geared together for relative pivotal movement in opposite directions, whereby the hooks may be swung into and out of the path of movement of the mold to engage and release the same, a lever arm on one of said bars, and a cam track fixed adjacent said member to contact said lever arm and actuate said hooks.

16. In a foundry installation of the class described, in combination, a casting machine, a mold mounted thereon for pivotal dumping movement in a vertical plane, a mold discharging device associated with said casting machine and comprising an oscillatable mold handling member, said member being movable in one direction to rotate the mold about its pivot point to discharge a casting therefrom and in the reverse direction to return the mold to its initial position on the machine, a pair of hook elements on said member, spaced apart in the direction of movement of the member and the mold, disposed so as to extend in opposite directions and opening toward each other, one of said hooks adapted to engage a mold during the upward swing of the member and mold in mold dumping direction and the other in mold returning direction, the mold passing from the control of one of said hooks to that of the other as it passes the upper dead-center position of its arc of movement.

WILLIAM F. EPPENSTEINER.